United States Patent [19]

Ware

[11] Patent Number: 4,513,763
[45] Date of Patent: Apr. 30, 1985

[54] INERTIAL VALVE APPARATUS

[76] Inventor: Ray L. Ware, 6620 English Colony Way, Penryn, Calif. 95663

[21] Appl. No.: 557,326

[22] Filed: Dec. 2, 1983

[51] Int. Cl.³ .............................................. F16K 17/36
[52] U.S. Cl. .................................. 137/38; 137/625.27; 251/74
[58] Field of Search ................ 137/38, 39, 45, 625.27; 251/74

[56] References Cited

U.S. PATENT DOCUMENTS

| 406,290 | 7/1889 | Murdock | 137/38 |
|---|---|---|---|
| 2,396,809 | 3/1946 | Addison | 251/74 X |
| 2,615,461 | 10/1952 | Crow | 251/74 X |
| 3,791,396 | 2/1974 | Nelson | 137/38 |
| 3,995,651 | 12/1976 | Adams | 137/38 |
| 4,007,643 | 2/1977 | Matsushita | 74/2 |
| 4,103,697 | 8/1978 | Kiesow | 137/45 |
| 4,165,758 | 8/1979 | Douce | 137/38 |
| 4,178,952 | 12/1979 | Baker et al. | 137/38 |

FOREIGN PATENT DOCUMENTS 97976  6/1982  Japan ..................... 137/38

Primary Examiner—Robert G. Nilson
Attorney, Agent, or Firm—Craig A. Wood

[57] ABSTRACT

An inertial valve apparatus is disclosed for automatically stopping the flow of liquids or gases in the event of an earthquake or similar vibration, and simultaneously causing the liquid or gas to be vented. The apparatus includes a spring loaded double-seated valve that is held in an unactuated position by a latch. A mass is adjustably suspended, according to the sensitivity to vibrations desired, along a trigger arm connected to the latch, so that movement of the mass in response to vibrations causes the latch to release, permitting the valve to move to an actuated position where the normal flow of liquid or gas is stopped and venting takes place.

15 Claims, 4 Drawing Figures

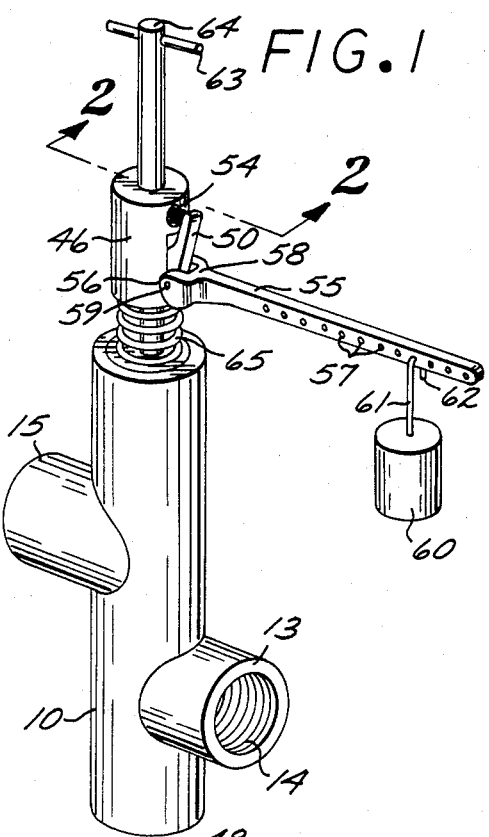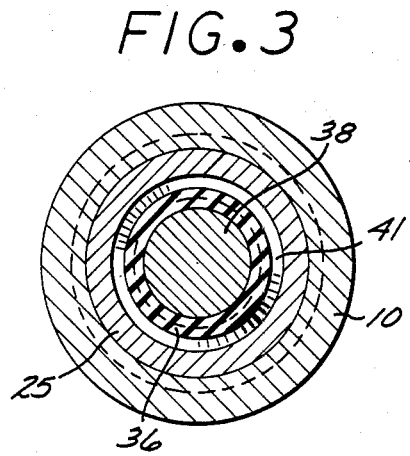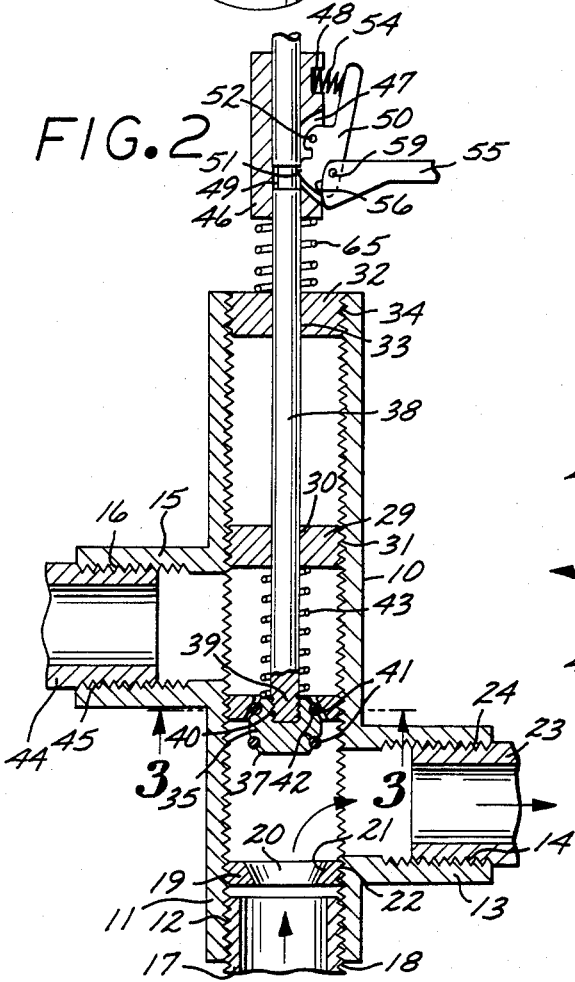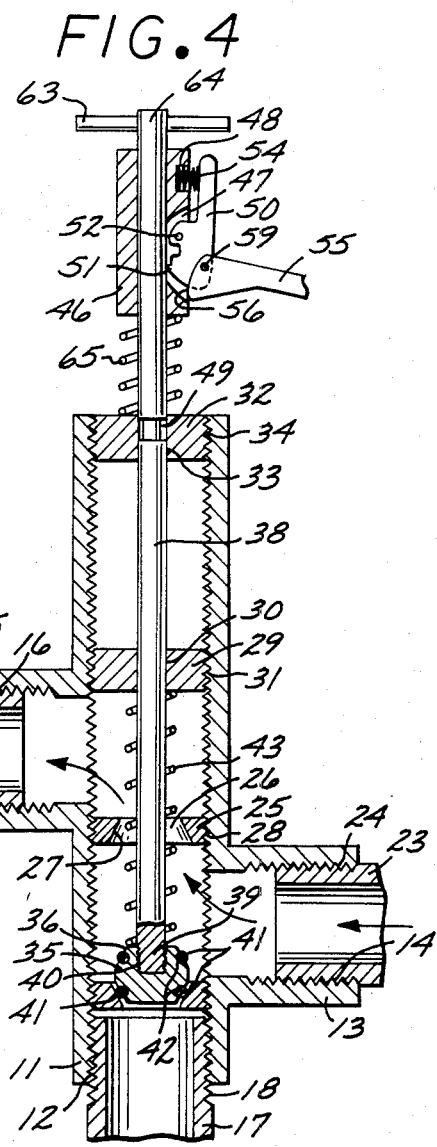

INERTIAL VALVE APPARATUS

BACKGROUND OF THE INVENTION

1. Field of the Invention

The present invention relates to an automatic inertial valve apparatus for closing a valve in response to vibrations from earthquakes and other causes, and for venting the material carried through the valve.

2. Description of Prior Art

As a result of an earthquake or other shock, lines conveying gases and liquids may rupture or break, producing spills that may lead to fire, explosion or contamination. Various automatic valves have been proposed to cut-off the flow of material in such an eventuality, including the devices of U.S. Pat. Nos. 4,178,952, 4,165,758, 4,103,697, 4,007,643, 3,995,651, and 3,791,396.

Despite the availability of such devices, there exists a need in the art for an improved automatic valve apparatus that will operate in an emergency, under harsh conditions, after long periods of inactivity, yet is easily adjusted and is capable of venting the material carried through the valve.

SUMMARY OF THE INVENTION

In order to aid in the understanding of the present invention, it can be stated in essentially summary form that it is directed to an inertial valve apparatus that is automatically actuated by earth movements and other shocks, and upon actuation, acts to vent the material carried through the valve, yet is adjustable to be responsible to movements of varying severity. To this end, a spring-loaded valve is held by a latch in a position permitting normal flow of material into and out of a housing. Upon a vibration of the apparatus, relative rotation of a trigger arm causes the latch to release, thereby permitting the valve to move to a position where no material may enter the housing, and where pressurized material that had previously flowed out of the housing is able to flow into the housing once again, and then safely out of the housing through a vent port.

It is an object of the present invention to provide an automatic inertial valve apparatus that is capable of operation in an emergency after long periods of time without operation.

It is another object of the present invention to provide an automatic inertial valve apparatus that automatically vents material that has flowed through the apparatus in the event of actuation of the apparatus.

It is still another object of the present invention to provide an automatic inertial valve apparatus that is adjustable to be actuated upon vibrations of differing severity.

Further objects and advantages of this invention will be apparent from a study of the following portion of the specification, the claims and the attached drawings.

BRIEF DESCRIPTION OF THE DRAWINGS

FIG. 1 is a perspective view of an inertial valve apparatus embodying the present invention.

FIG. 2 is a section view of the present invention in an unactuated position taken along line 2—2 of FIG. 1.

FIG. 3 is a section view taken along line 3—3 of FIG. 2.

FIG. 4 is a section view of the present invention in an actuated position taken along line 2—2 of FIG. 1.

DESCRIPTION OF THE PREFERRED EMBODIMENT

The following specification, taken in conjunction with the drawings, sets forth the preferred embodiment of the present invention. The embodiment of the invention disclosed herein is the best mode contemplated by the inventor for carrying out his invention in a commercial environment, although it should be understood that various modifications can be accomplished within the parameters of the present invention.

The preferred embodiment contemplates the use of the present invention in a natural gas pipeline system, located near a structure within which the natural gas is used. However, the present invention may be used in pipeline systems carrying other gases or carrying liquids at any point along the pipeline system. Thus, this description of an inertial valve apparatus is exemplary only.

Referring now to the drawings for a detailed description of the present invention, reference is made first to FIG. 2, showing a generally cylindrical housing 10, having an inlet port 11 with internal threads 12 that run the length of housing 10, an outlet port 13 with internal threads 14, and a vent port 15 with internal threads 16. A first pipeline fitting 17, having external threads 18 that mate with threads 12, acts to deliver gas into housing 10. A lower valve seat 19 having a lower valve seat aperture 20 with annular beveled lower surface 21, and external threads 22 that mate with threads 12, is disposed inside housing 10 between the output port 13 and the input port 11. A second pipeline fitting 23, having external threads 24 that mate with threads 14, acts to remove gas from housing 10 when the present invention is in an unactuated position, as depicted in FIG. 2. As seen in FIGS. 2 and 4, a third pipeline fitting 44, having external threads 45 that mate with threads 16, acts to vent gas from housing 10 and pipeline connected to pipeline fitting 23, when the present invention is in an actuated position as depicted in FIG. 4.

As seen generally in FIG. 4, an upper valve seat 25 having an upper valve seat aperture 26 with annular beveled upper surface 27 and external threads 28, is disposed inside housing 10 between output port 13 and vent port 15.

As seen in FIGS. 2 and 4, a lower valve stem guide 29 having a lower valve stem aperture 30 and threads 31 that mate with threads 12, is disposed inside housing 10 above vent port 15. An upper valve stem guide 32 having an upper valve stem aperture 33 and threads 34 that mate with threads 12, is disposed inside housing 10 so that the top of upper valve stem guide is flush with the upper end of housing 10. A valve head 35 having annular beveled upper and lower edges 36 and 37, respectively, each having an annular groove 42, is capable of fitting alternatively into annular beveled upper and lower surfaces 27 and 21, respectively, is disposed between upper valve seat 25 and lower valve seat 19, and is attached to cylindrical valve stem 38 by way of threaded end 39 that mates with threads 40 tapped into valve head 35. Flexible O-rings 41 fit into annular grooves 42, so as to form a gas-tight seal with annular beveled upper edge 36 in the unactuated position as shown in FIG. 2, or with annular beveled lower edge 37 in the actuated position as shown in FIG. 4. An actuation coil spring 43, having inside diameter permitting it to fit around valve stem 38 and outside diameter permitting it to move through upper valve seat aperture 26, is disposed around valve stem 38, between valve head 35 and lower valve stem guide 29, and is of sufficient length so as to bias valve head 35 towards the actuated position as shown in FIG. 4.

As shown in FIGS. 2 and 4, a trigger sleeve 46, having a sear aperture 47 and a sear coil spring well 48, is disposed around valve stem 38 external to housing 10, and is positioned so that perimeter slot 49 at the upper end of valve stem 38 is adjacent to sear aperture 47. A sear 50 having a sear notch 51 is rotatably attached to trigger sleeve 46 by way of pivot pin 52, so that sear notch 51 is rotatable into perimeter slot 49, and is biased towards the same configuration by sear coil spring 54, disposed between trigger sleeve 46 and sear 50 at sear coil spring well 48, and by trigger sleeve coil spring 65 disposed around valve stem 38 and between trigger sleeve 46 and upper valve stem guide 32.

As depicted generally in FIG. 1, a trigger arm 55 having a camming surface 56, a plurality of trigger arm holes 57, and forked end 58 is rotatably attached to sear 50 by pivot pin 59 so that camming surface 56 is in contact with trigger sleeve 46, and rotation of trigger arm 55 about pivot pin 59 in turn causes rotation of sear 50 about pivot pin 52, whereby sear notch 51 is removed from perimeter slot 49. A mass 60 is attached to mass suspension rod 61 having a hooked end 62 that is rotatably disposed through one of trigger arm holes 57. A reset handgrip 63 is attached to an unthreaded end 64 of trigger shaft 38 so as to permit transition of the present invention from the actuated position to the unactuated position by pulling vertically on reset handgrip 63.

When the present invention is in the unactuated position as depicted in FIG. 2, gas flows from a gas pipeline (not shown) through first pipefitting 17 into inlet port 11, through lower valve seat aperture 20, into housing 10, then out through outlet port 13, second pipefitting 23, and into a gas outlet system (not shown) for delivery to the location where the gas is to be used. Gas is prevented from flowing through upper valve seat aperture 26 due to the presence of annular beveled upper edge 36 of valve head 35 seated against annular beveled upper surface 27 of upper valve seat 25, utilizing an O-ring 41 to form a gas-tight seal.

Upon the occurrence of an earthquake or similar vibration, vertical movement of mass 60 causes rotation of trigger arm 55 about pivot pin 59, so that the camming surface 56 on forked end 58 rotatably contacts the outside of trigger sleeve 46. Sear 50 is thus caused to rotate about pivot pin 52, so that sear notch 51, that had heretofore been biased so as to be disposed in perimeter slot 49 by way of sear coil spring 54 and trigger sleeve coil spring 65, is removed from perimeter slot 49. As a result actuation coil spring 43 causes valve head 35 and valve stem 38 to move to the actuated position depicted in FIG. 4, where gas is prevented from flowing into housing 10 through lower valve seat aperture 20 due to the presence of annular beveled lower edge 37 of valve head 35 seated against annular beveled lower surface 21 of lower valve seat 19, utilizing an O-ring 41 to form a gas-tight seal. As shown in FIG. 4, gas that had previously flowed out through outlet port 13 will now flow in the reverse direction into outlet port 13, through housing 10, through upper valve seat aperture 26, and out through vent port 15 into third pipefitting 44 to a venting or gas containment system (not shown) that is maintained at a pressure less than the pressure of the gas in the gas outlet system. As a result, gas in the gas outlet system is removed to a safe location, decreasing the amount of gas capable of leaking from a break in the gas output system caused by the earthquake or vibration, thereby lessening the likelihood of explosion or fire near the gas output system.

The sensitivity of the present invention to earthquakes and vibrations of various magnitudes is controlled by changing the position of mass 60 with respect to the axis of rotation of trigger arm 55 about pivot pin 59, by changing the particular trigger arm hole 57 through which the hooked end 62 of the mass suspension rod 61 is placed. The trigger arm holes 57 may be placed along the trigger arm so as to correspond to actuation of the present invention upon the occurrence of earthquakes or vibrations of predetermined and well-known magnitudes, according to the needs of the application.

The present invention having been described in its preferred embodiment, it is clear that it is susceptible to numerous modifications and embodiments within the ability of those skilled in the art and without the exercise of the invention faculty. Accordingly, the scope of the present invention is defined by the scope of the following claims.

What is claimed is:

1. Inertial valve apparatus comprising:
    a housing tube having an inlet port, an outlet port, and a vent port;
    a valve contained within said housing tube moveable between an unactuated position where said inlet port is open, said outlet port is open, and said vent port is closed, and an actuated position where said inlet port is closed, said outlet port is open, and said vent port is open;
    biasing means urging said valve towards the actuated position;
    latch means holding said valve in the unactuated position against the urging of said biasing means;
    inertial trigger means for releasing said latch means in response to vibrations, causing said valve to move to the actuated position;
    a lower valve seat, having a lower valve seat aperture and defining said input port and attached to one end of said housing tube;
    an upper valve seat, having an upper valve seat aperture, attached to the interior of said housing tube, positioned so that said output port is located between said upper valve seat and said lower valve seat;
    a lower valve stem guide having a lower valve stem aperture whose axis is parallel to the axis of said housing tube, attached to the interior of said housing tube so that said vent port is located between said lower valve stem guide and said upper valve seat; and
    an upper valve stem guide having an upper valve stem aperture whose axis is parallel to the axis of said housing tube, attached to the other end of said housing tube.

2. Inertial valve apparatus as defined in claim 1, wherein said valve comprises:
    a valve head located in the interior of said housing tube between said upper valve seat and said lower valve seat; and
    a valve stem whose axis is parallel to the axis of said housing tube, of a size permitting movement through said lower valve stem aperture and said upper valve stem aperture, and attached on one end to said valve head.

3. Inertial valve apparatus as defined in claim 2, wherein:
   said lower valve seat has an annular beveled upper surface;
   said upper valve seat has an annular beveled lower surface; and
   said valve head comprises
      a circular disk having an annular beveled lower edge capable of fitting into said annular beveled upper surface and an annular beveled upper edge capable of fitting into said annular beveled lower surface.

4. Inertial valve apparatus as defined in claim 3, wherein:
   said annular beveled lower edge and said annular beveled upper edge each has a concentric parallel annular groove; and
   said valve head further comprises an O-ring located in each annular groove.

5. Inertial valve apparatus as defined in claims 2, 3, or 4, wherein said biasing means comprises an actuation coil spring positioned around said valve stem and located between said valve head and said lower valve stem guide, having a diameter permitting movement through said upper valve seat aperture.

6. Inertial valve apparatus as defined in claims 1, 2, 3 or 4, further comprising reset means for causing said valve to move from the actuated position to the unactuated position.

7. Inertial valve apparatus comprising:
   a housing tube having an inlet port, an outlet port, and a vent port;
   a lower valve seat having a lower valve seat aperture and defining said input port and attached to one end of said housing tube;
   an upper valve seat, having an upper valve seat aperture, attached to the interior of said housing tube, positioned so that said output port is located between said upper valve seat and said lower valve seat;
   a lower valve stem guide having a lower valve stem aperture whose axis is parallel to the axis of said housing tube, attached to the interior of said housing tube so that said vent port is located between said lower valve stem guide and said upper valve seat;
   an upper valve stem guide having an upper valve stem aperture whose axis is parallel to the axis of said housing tube, attached to the other end of said housing tube;
   a valve head located in the interior of said housing tube between said upper valve seat and said lower valve seat moveable between an unactuated position where said inlet port is open, said outlet port is open, and said vent port is closed, and an actuated position where said inlet port is closed, said outlet port is open, and said vent port is open;
   a valve stem whose axis is parallel to the axis of said housing tube, of a size permitting movement through said lower valve stem aperture and said upper valve stem aperture, and attached on one end to said valve head and the other end disposed through said upper valve stem aperture, said other end and having a perimeter slot;
   a trigger sleeve having a sear aperture disposed around the other end of said valve stem so that said sear aperture is adjacent to said perimeter slot;
   a sear having a sear notch;
   means for rotatably attaching said sear to said trigger sleeve so that said sear notch is rotatable into said perimeter slot;
   sear biasing means urging said sear notch into said perimeter slot;
   biasing means urging said valve towards the actuated position; and
   inertial trigger means for releasing said latch means in response to vibrations, causing said valve to move to the actuated position.

8. Inertial valve apparatus as defined in claim 7, wherein said means for rotatably attaching said sear to said trigger sleeve comprises a sear pivot pin attached to said sear and rotatably attached to said trigger sleeve.

9. Inertial valve apparatus as defined in claim 8, wherein said sear biasing means comprises:
   a sear coil spring disposed between said trigger sleeve and said sear; and
   a trigger sleeve coil spring disposed around said valve stem and between said trigger sleeve and said upper valve stem guide.

10. Inertial valve apparatus as defined in claim 7, wherein said inertial trigger means comprises
    a trigger arm having a camming surface;
    means for rotatably attaching said trigger arm to said sear so that said trigger arm is disposed generally perpendicular to said housing tube and the camming surface of said trigger arm rotatably contacts said trigger sleeve;
    a mass; and
    means for adjustably and rotatably suspending said mass from said trigger arm.

11. Inertial valve apparatus as defined in claim 10, wherein said means for rotatably attaching said trigger arm to said sear comprises a trigger arm pivot pin attached to said trigger arm and rotatably attached to said sear.

12. Inertial valve apparatus as defined in claim 11, wherein said means for adjustably and rotatably suspending said mass from said trigger arm comprises a mass suspension rod attached on one end to said mass and rotatably and removeably attached on the other end at one of a plurality of positions along said trigger arm.

13. Inertial valve apparatus as defined in claims 7, 8, or 10, wherein said biasing means comprises an actuation coil spring positioned around said valve stem and located between said valve head and said lower valve stem guide, having a diameter permitting movement through said upper valve seat aperture.

14. Inertial valve apparatus as defined in claims 7, 8, 9, 10, 11, or 12, further comprising reset means for causing said valve to move from the actuated position to the unactuated position.

15. Inertial valve apparatus as defined in claim 14, wherein said reset means comprises a reset handgrip attached generally perpendicular to the other end of said valve stem.

* * * * *